United States Patent
Ohrbom et al.

(10) Patent No.: US 7,368,501 B2
(45) Date of Patent: May 6, 2008

(54) METHOD FOR IMPROVING ENVIRONMENTAL DURABILITY OF MATERIALS

(75) Inventors: Walter H. Ohrbom, Hartland Township, MI (US); Marvin L. Green, Brighton, MI (US); Gregory G. Menovcik, Farmington Hills, MI (US)

(73) Assignee: BASF Corporation, Southfield, MI (US)

( * ) Notice: Subject to any disclaimer, the term of this patent is extended or adjusted under 35 U.S.C. 154(b) by 401 days.

(21) Appl. No.: 10/866,607

(22) Filed: Jun. 11, 2004

(65) Prior Publication Data

US 2004/0225028 A1  Nov. 11, 2004

Related U.S. Application Data

(60) Continuation-in-part of application No. 10/351,079, filed on Jan. 23, 2003, now Pat. No. 6,962,730, which is a division of application No. 09/741,511, filed on Dec. 19, 2000, now Pat. No. 6,541,594.

(51) Int. Cl.
 *C08G 18/08* (2006.01)
 *C08K 5/13* (2006.01)
 *C08F 18/00* (2006.01)

(52) U.S. Cl. ............ 524/714; 524/736; 525/418; 526/320; 526/328

(58) Field of Classification Search ......... 524/714, 524/736; 525/418; 526/320, 328
See application file for complete search history.

(56) References Cited

U.S. PATENT DOCUMENTS

| | | | |
|---|---|---|---|
| 4,118,427 A | 10/1978 | Rhein et al. | |
| 4,118,437 A | 10/1978 | Parekh | |
| 4,246,376 A | 1/1981 | Didomenico, Jr. | |
| 4,343,728 A | 8/1982 | Eschwey et al. | |
| 4,546,120 A | 10/1985 | Perrman et al. | |
| 5,106,651 A | 4/1992 | Tyger et al. | |
| 5,236,987 A | 8/1993 | Arendt | |
| 5,334,650 A | 8/1994 | Serdiuk et al. | |
| 5,587,428 A | 12/1996 | Jones et al. | |
| 5,688,867 A | 11/1997 | Scheibelhoffer et al. | |
| 5,783,272 A | 7/1998 | Wong | |
| 6,228,953 B1 | 5/2001 | Barancyk et al. | |
| 6,541,594 B2 * | 4/2003 | Ohrbom et al. | 528/45 |
| 6,583,212 B2 * | 6/2003 | Borst et al. | 524/501 |
| 2002/0086966 A1 | 7/2002 | Weise et al. | |
| 2002/0107325 A1 | 8/2002 | Gilbert et al. | |
| 2002/0169249 A1 * | 11/2002 | Borst et al. | 524/501 |
| 2003/0078316 A1 | 4/2003 | Bradford et al. | |

FOREIGN PATENT DOCUMENTS

| | | |
|---|---|---|
| EP | 026 984 | 9/1980 |
| WO | WO 95/19997 | 7/1995 |
| WO | WO 96/23034 | 1/1996 |
| WO | WO 96/23035 | 1/1996 |
| WO | WO 99/35189 | 7/1999 |
| WO | WO 02/50203 | 6/2002 |

OTHER PUBLICATIONS

Norification of Transmittal of the International Search Report and Written Opionion for PCT/US2005/20610, Oct. 6, 2005.
Frank N. Jones, "End-grafting of oligoesters based on terephthalic acid and linear diols for high Solids coatings", Apr. 21, 1995, pp. 1609-1618.
Robson F. Storey, et al., "Proceedings of the twenty-fourth international waterborne, high-solids, And powder coatings symposium", Feb. 5-7, 1997, pp. title, and pp. 1-21.
Frank N. Jones, et al., "Recent studies of self-condensation and co-condensation of melamine-Formaldehyde resins; cure at low temperatures", pp. 189-208.
Robson F. Storey, et al., "Proceedings of the seventeenth international waterborne, high-solids, And powder coatings symposium", Feb. 21-23, 1990, pp. title, and pp. 447-471.
Shubang Gan, et al., Recent studies of the curing of polyester-melamine enamels, possible Causes of overbake softening:, Feb. 1-3, 1989, pp. 87-109.

* cited by examiner

*Primary Examiner*—Randy Gulakowski
*Assistant Examiner*—M. Bernshteyn

(57) ABSTRACT

Disclosed is a method of making an environmentally durable material, the method requiring providing a material comprising at least one functional group $F_c$, and subjecting the material to a free radical source such that substantially all functional groups $F_c$ are eliminated but the material is not polymerized. In one embodiment, the functional group $F_c$ is at least one of a nonaromatic carbon-carbon double bond, a hydrogen atom alpha to an aromatic ring, a hydrogen atom alpha to a carbon-carbon double bond, or a hydrogen atom attached to a tertiary substituted carbon. In another embodiment, functional group $F_c$ is present in the material as a contaminant. In one exemplary embodiment, the material comprises from 0.05 to less than 15% by weight of functional group $F_c$, based on the total weight of the material.

11 Claims, No Drawings

METHOD FOR IMPROVING ENVIRONMENTAL DURABILITY OF MATERIALS

CROSS REFERENCE TO RELATED APPLICATIONS

This application is a continuation-in-part of and claims priority on Ser. No. 10/351,079, filed Jan. 23, 2003, which is a divisional of U.S. Pat. No. 6,541,594, filed Dec. 19, 2000.

FIELD OF THE INVENTION

The invention relates to the manufacture of environmentally durable components for use in curable coating compositions, especially curable coating compositions having a low or reduced VOC.

BACKGROUND OF THE INVENTION

Curable thermoset coating compositions are widely used in the coatings art. They are often used as topcoats in the automotive and industrial coatings industry. Such topcoats may be basecoats, clearcoats, or mixtures thereof. Color-plus-clear composite coatings are particularly useful as topcoats where exceptional gloss, depth of color, distinctness of image, or special metallic effect is desired. The automotive industry has made extensive use of these coatings for automotive body panels.

Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI). Finally, such composite coatings must also simultaneously provide a desirable balance of finished film properties such as durability, hardness, flexibility, and resistance to environmental etch, scratching, marring, solvents, and/or acids.

In order to obtain the extremely smooth finishes that are generally required in the coatings industry, coating compositions must exhibit good flow before curing. Good flow is observed when the coating composition is fluid enough at some point after it is applied to the substrate and before it cures to a hard film to take on a smooth appearance. Some coating compositions exhibit good flow immediately upon application and others exhibit good flow only after the application of elevated temperatures.

One way to impart fluid characteristics and good flow to a coating composition is to incorporate volatile organic solvents into the composition. These solvents provide the desired fluidity and flow during the coating process, but evaporate upon exposure to elevated curing temperatures, leaving only the coating components behind.

However, the use of such solvents increases the volatile organic content (VOC) of the coating composition. Because of the adverse impact that volatile organic solvents may have on the environment, many government regulations impose limitations on the amount of volatile solvent that can be used. Increasing the percentage of nonvolatile components (% NV) of a coating composition or decreasing the VOC provides a competitive advantage with respect to environmental concerns, air permitting requirements, and cost.

Prior art attempts to improve the VOC of polymers and coating compositions have generally focused on the removal of volatile organic solvents from polymers by methods such as vacuum distillation. However, such techniques have significant disadvantages. First, they generally require the use of more energy and labor that leads to higher costs. Increased costs also result from the disposal of removed solvent. Finally, the viscosity of the stripped polymer often creates processing and manufacturing challenges.

Although good flow and decreased VOC are highly desired, such improvements must not be obtained at the cost of environmental durability and weatherability. It will be appreciated that the prior art has long attempted to provide improvements in the environmental durability as measured by testing apparatus such as the QUV cabinet made by Q-Panel Lab Products of Cleveland, Ohio, and WOM weatherometers made by Atlas Material Testing Solutions of Chicago, Ill., and the like. Such improvements are highly desired since they immediately translate to longer and better performance lifetimes for applied coatings.

Thus, it would desirable if improvements in environmental durability could be obtained in individual components of curable coating compositions. In another aspect, it would be desirable if improvements in flow and VOC could be obtained with simultaneous improvements in environmental durability and weatherability.

SUMMARY OF THE INVENTION

Disclosed is a method of making an environmentally durable material for use in a curable coating composition, the method requiring the provision of a material comprising at least one functional group $F_c$, and subjecting the material to a free radical source such that substantially all functional groups $F_c$ are eliminated via reaction but the material is not polymerized.

In one embodiment, the functional group $F_c$ is at least one of a nonaromatic carbon-carbon double bond, a hydrogen atom alpha to an aromatic ring, a hydrogen atom alpha to a carbon-carbon double bond, or a hydrogen atom attached to a tertiary substituted carbon. In another embodiment, functional group $F_c$ is present in the material at a concentration typically associated with a contaminant or impurity. In one exemplary embodiment, the material comprises from 10 to less than 0.1% by weight of functional group $F_c$, based on the total weight of the material.

Also provided is an environmentally durable material made by the disclosed method and a curable coating composition comprising the disclosed environmentally durable material.

DETAILED DESCRIPTION OF THE INVENTION

A method is disclosed for making an environmentally durable material. In one embodiment, the resulting environmentally durable material will be used as a component of a curable coating composition. In one exemplary embodiment, the environmentally durable material will be used as a reactive component of a curable coating composition. A reactive component as used herein refers to a component that enters into the crosslinking reaction and becomes part of the cured three-dimensional crosslinked film matrix.

Environmental durability as used herein refers to those performance characteristics of cured films that are measured by QUV cabinets, using UVB-313 bulbs and WOM CI-65 weatherometers. Environmental durability also includes performance properties such as environmental etch, and chemical resistance, including acid and gasoline spot resistance. Materials and components that are produced according to the disclosed method will have better environmental durability than comparative components or starting materials that have not been subjected to the disclosed method. In one embodiment, a material treated according to the disclosed method will have improved environmental durability relative to an identical material that has not been treated according to the disclosed method.

It has unexpectedly been found that the disclosed method results in environmentally durable materials that have reduced amounts of free radical precursors. Without wishing to be bound by a particular theory, it is believed that the presence of certain free radical precursors, in even very small amounts, may be deleterious to the environmental durability of a curable coating composition that has been applied to a substrate and cured. In particular, it is theorized that the presence of certain free radical precursors in amounts normally associated with unwanted impurity or contaminant concentrations may be responsible for some less than optimum environmental durability and weatherability test results. These negative performance properties in an applied and cured coating are thought to be due to the instability of these precursors in the presence of environmental triggers such as sunlight and ultraviolet light and the creation of unacceptable stresses and/or defects in a cured film.

In one embodiment, the disclosed method comprises providing a material comprising at least one functional group $F_c$, and subjecting the material to a free radical source such that substantially all functional groups $F_c$ are eliminated by a free radical reaction but the material is not polymerized.

Materials suitable for treatment by the disclosed method include compounds, oligomers, and polymers such as are usually employed in curable coating compositions. Thus, the disclosed method is applicable only to curable coating components that have not been applied to a substrate and/or cured. In one embodiment, such materials may have a number average molecular weight of at least 300 Daltons, while in another embodiment, such materials may have a number average molecular weight of no more than 3600 Daltons. In one exemplary embodiment, suitable materials will have a number average molecular weight of from 300 to 1000 Daltons.

Materials believed to benefit from treatment with the disclosed method are those materials having at least one functional group $F_c$. In one embodiment, functional groups $F_c$ are those functional groups that give rise to free radicals upon exposure to a free radical trigger. Free radical triggers include electromagnetic radiation, especially sunlight and ultraviolet light, thermal energy, ultrasonic energy, pollution, smog, other sources of environmental fallout, and the like. A particularly damaging free radical trigger is ultraviolet energy or radiation.

In one embodiment, illustrative examples of functional group $F_c$ include a nonaromatic carbon-carbon double bond, an extractable hydrogen atom, and mixtures thereof. Examples of extractable hydrogen atoms include a hydrogen atom alpha to an aromatic ring, a hydrogen atom alpha to a carbon-carbon double bond, a hydrogen atom attached to a tertiary substituted carbon, and mixtures thereof.

For example, in one embodiment, an extractable hydrogen may be represented by the formula: $X-(H)C-(R^1)_2$, wherein X is either a hydrogen atom, an aromatic ring, a carbon-carbon double bond, an alkyl group, a cycloaliphatic group, or an aryl group; and $R^1$ may be the same or different and is at least one of an alkyl group, a cycloaliphatic group, or an aryl group. In one exemplary embodiment, an extractable hydrogen may be represented by the formula: $X-(H)C-(R^1)_2$, wherein X is either an aromatic ring, a carbon-carbon double bond, an alkyl group, a cycloaliphatic group, or an aryl group; and $R^1$ may be the same or different and is at least one of an alkyl group, a cycloaliphatic group, or an aryl group.

In another embodiment, an extractable hydrogen may be represented by the formula:

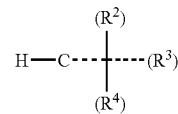

wherein $R^2$, $R^3$, and $R^4$ may be the same or different and are at least one of hydrogen, an alkyl group, a cycloaliphatic group, or an aryl group, with the proviso that only one of $R^2$, $R^3$, and $R^4$ may be hydrogen. In one exemplary embodiment, none of $R^2$, $R^3$, and $R^4$ will be hydrogen.

In one embodiment, the materials subjected to the disclosed method will comprise a plurality of functional groups $F_c$. In another embodiment, materials subjected to the disclosed method will be materials not normally subjected to free radical polymerization processes. For example, in this embodiment, provided materials will be substantially free of those functional groups that react under free radical polymerization to result in a significant increase in molecular weight. Substantially free as used only in this context refers to a concentration of functional groups $F_c$ that does not include concentrations of contaminants or impurities. That is, in one exemplary embodiment, functional group $F_c$ will be present in suitable materials as a contaminant or impurity. For example, in one embodiment, a material suitable for treatment by the disclosed method will comprise less than 15% by weight of functional group $F_c$, based on the total weight of the material. In another embodiment, a material suitable for treatment by the disclose method will comprise at least 0.05% by weight of functional group $F_c$, based on the total weight of the material. In one exemplary embodiment, a material suitable for treatment by the disclosed method will comprise from 0.1 to 5% by weight of functional group $F_c$, based on the total weight of the material.

Illustrative examples of suitable materials containing a functional group $F_c$ may generally include any materials or components normally associated with a curable coating composition. In one embodiment, suitable materials may include binders, crosslinking agents, solvents, diluents, reactive components, reactive solvents, modifiers, additives, and the like as well as mixtures thereof. In one exemplary embodiment, a suitable material will be a binder, a reactive component, a reactive solvent or a mixture thereof.

Illustrative examples of suitable materials that might be subjected to the disclosed process include dimers and oligomers of fatty acids, saturated fatty acids, and derivatives thereof; epoxy and epoxy upgrade materials; polyesters, especially cyclic anhydride based polyesters; polyurethanes, including chain extend polyurethanes; polydienes; alpha polyolefins, and the like. In one embodiment, such binders will contain functional groups that do not degrade under free radical polymerization conditions. Illustrative examples of specific materials that might be subjected to the disclosed process include nonvolatile solvents ($b_{nv}$), including but not limited to diethyl octanediol, neodecanoic acid, the glycidyl ester of neodecanoic acid, the cyclic carbonate of the glycidyl ester of neodecanoic acid, and the like.

In one exemplary embodiment, the material to be treated by the disclosed method will be a nonvolatile solvent ($b_{nv}$). Illustrative examples of suitable nonvolatile solvents ($b_{nv}$) are generally those materials that may be an amphorous solid, wax, or liquid at room temperature but are nonetheless a fluid solid at the temperature that the polymerization reaction of reactant mixture (a) occurs. "Nonvolatile" as used herein refers to materials having a boiling point at least 100° C., preferably 200° C., most preferably 300° C., above the polymerization temperature. A "fluid solid" refers to a nonvolatile material that has a viscosity similar to a traditional solvent at the polymerization temperature.

In one embodiment, the nonfunctional part of suitable nonvolatile solvents ($b_{nv}$) will have from 8 to 300 carbons. In another embodiment, nonvolatile solvent ($b_{nv}$) will be have at least one functional group ($F_1$), while in one exemplary embodiment; nonvolatile solvent ($b_{nv}$) will have at least two functional groups ($F_1$). In another embodiment, nonvolatile solvent ($b_{nv}$) will be substantially free of heteroatoms as discussed below. Other illustrative examples for suitable nonvolatile solvents ($b_{nv}$) include diethyl octanediol, neodecanoic acid, the glycidyl ester of neodecanoic acid, the cyclic carbonate of the glycidyl ester of neodecanoic acid, alpha polyolefinpolyols, alpha polyolefin polyacids, and the like.

In another embodiment, suitable nonvolatile solvents ($b_{nv}$) may also comprise heteroatom containing linking groups, i.e. containing atoms other than carbon or hydrogen. Illustrative examples of such heteroatom containing linking groups include ethers, ureas, esters, urethanes, silanes and the like.

In one especially exemplary embodiment, the nonvolatile solvent ($b_{nv}$) will be a reactive component (c). In one embodiment, the non-functional part of reactive component (c) will have from 12 to 72 carbons, more preferably from 18 to 54 carbons, and most preferably from 36 to 54 carbons. In one particularly exemplary embodiment, the nonfunctional part of reactive component (c) will have 36 carbons and at least two functional groups ($F_1$).

In one exemplary embodiment, reactive component (c) will be substantially free of heteroatoms. "Heteroatoms" as used herein refers to atoms other than carbon or hydrogen. The phrase "substantially without heteroatoms" as used herein means that the portion of reactive component (c) which does not include functional groups ($F_1$) will generally have no more than two atoms which are other than carbon or hydrogen, i.e., atoms such as N, O, Si, mixtures thereof, and the like. More preferably, that portion of reactive component (c) that does not include functional groups ($F_1$) will have no more than two atoms that are other than carbon or hydrogen. In a particularly exemplary embodiment, that portion of reactive component (c) that does not include functional groups ($F_1$) will have no heteroatoms, i.e., will consist solely of carbon and hydrogen atoms. Thus, in a most preferred aspect of the invention, the only heteroatoms in reactive component (c) will be present in functional groups ($F_1$).

In one exemplary embodiment, reactive component (c) will not be a crystalline solid at room temperature, i.e., at temperatures of from 65 to 75° F. "Crystalline" refers to a solid characterized by a regular, ordered arrangement of particles. Rather, in this embodiment, reactive component (c) will be an amorphous solid, a wax or a liquid at room temperature. "Amorphous" refers to a noncrystalline solid with no well-defined ordered structure.

In another exemplary embodiment, reactive component (c) will comprise a mixture of two or more saturated or unsaturated structures selected from the group consisting of noncyclic structures for reactive component (c), aromatic-containing structures for reactive component (c), cyclic-containing structures for reactive component (c), and mixtures thereof. Saturated structures are preferred, especially where durability issues are of concern. For example, a most preferred reactive component (c) will comprise a mixture of two or more structures selected from the group consisting of aliphatic structures for reactive component (c), aromatic-containing structures for reactive component (c), cycloaliphatic-containing structures for reactive component (c), and mixtures thereof.

It is particularly preferred that reactive component (c) comprise at least two, more preferably three, of the three cited structures. If reactive component (c) comprises only two of the three cited structures for reactive component (c), then at least one of the two structures must be present as a mixture of two or more isomers thereof.

For example, the mixture of reactive components (c) may comprise at least one aliphatic structure for reactive component (c) and at least one other structure for reactive component (c) selected from the group consisting of aromatic-containing structures for reactive component (c), cycloaliphatic-containing structures for reactive component (c), and mixtures thereof. If the 'at least one other structure for reactive component (c)' is not a mixture of aromatic-containing structures for reactive component (c) and cycloaliphatic-containing structures for reactive component (c), either the aromatic-containing structures or the cycloaliphatic containing structures must be present as a mixture of two or more isomers.

Alternatively, the mixture of reactive components (c) may comprise at least one aromatic-containing structure for reactive component (c) and at least one other structure for reactive component (c) selected from the group consisting of aliphatic structures for reactive component (c), cycloaliphatic-containing structures for reactive component (c), and mixtures thereof. If the 'at least one other structure for reactive component (c)' is not a mixture of aliphatic structures for reactive component (c) and cycloaliphatic-containing structures for reactive component (c), either the aliphatic structures or the cycloaliphatic containing structures must be present as a mixture of two or more isomers.

In a most preferred embodiment, reactive component (c) will comprise one or more aliphatic structures for reactive component (c), one or more aromatic-containing structures for reactive component (c), and one or more cycloaliphatic-containing structures for reactive component (c). Particularly advantageous mixtures of reactive component (c) will comprise from 3 to 25% by weight of reactive component (c) having an aliphatic structure, from 3 to 25% by weight of reactive component (c) having an aromatic-containing structure, and 50 to 94% by weight of reactive component (c) having a cycloaliphatic-containing structure. More preferred mixtures of reactive component (c) will comprise from 3 to 18% by weight of reactive component (c) having an aliphatic structure, from 5 to 23% by weight of reactive component (c) having an aromatic-containing structure, and 55 to 85% by weight of reactive component (c) having a cycloaliphatic-containing structure. Most preferred mixtures of reactive component (c) will comprise from 5 to 10% by weight of reactive component (c) having an aliphatic structure, from 10 to 20% by weight of reactive component (c) having an aromatic-containing structure, and 60 to 70% by weight of reactive component (c) having a cycloaliphatic-containing structure.

In one exemplary embodiment, reactive component (c) will comprise at least two functional groups ($F_1$) per molecule. Preferred reactive components (c) may have from two to six functional groups ($F_1$) while most preferably reactive component (c) will have two to three functional groups ($F_1$).

Functional groups ($F_1$) of nonvolatile solvent ($b_{nv}$) may be selected from a variety of active hydrogen containing groups and groups reactive with such active hydrogen containing groups. Examples of illustrative functional groups ($F_1$) are hydroxy, isocyanate (blocked or unblocked), epoxy, carbamate, aminoplast, aldehyde, acid, epoxy, amine, cyclic carbonate, urea, mixtures thereof, and the like.

Preferred functional groups ($F_1$) are hydroxyl, primary carbamate, isocyanate, aminoplast functional groups, epoxy, carboxyl and mixtures thereof. Most preferred functional groups ($F_1$) are hydroxyl, primary carbamate, and mixtures thereof, with primary carbamate groups being particularly preferred.

Illustrative examples of suitable nonvolatile solvents ($b_{nv}$) having functional groups ($F_1$) which are carboxyl are fatty acids and addition reaction products thereof, such as dimerized, trimerized and tetramerized fatty acid reaction products and higher oligomers thereof. Suitable acid functional dimers and higher oligomers may be obtained by the addition reaction of $C_{12-18}$ monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commercially available from Uniqema of Wilmington, Del.

Hydroxyl functional nonvolatile solvents ($b_{nv}$) are commercially available as the Pripol™ saturated fatty acid dimer (Pripol™ 2033) supplied by Uniqema of Wilmington, Del. Hydroxyl functional nonvolatile solvents ($b_{nv}$) may also be obtained by reduction of the acid group of the above-discussed fatty acids.

Nonvolatile solvents ($b_{nv}$) having two or more carbamate functional groups may be obtained via the reaction of the hydroxyl functional r nonvolatile solvents ($b_{nv}$) with a low molecular weight carbamate functional monomer such as methyl carbamate under appropriate reaction conditions. Alternatively, carbamate functional nonvolatile solvents ($b_{nv}$) may be made via decomposition of urea in the presence of hydroxyl functional nonvolatile solvent ($b_{nv}$) as described above. Finally, carbamate functional nonvolatile solvents ($b_{nv}$) can be obtained via the reaction of phosgene with the hydroxyl functional nonvolatile solvent ($b_{nv}$) followed by reaction with ammonia.

Amine groups suitable for use as functional group ($F_1$) may be primary or secondary, but primary amines are most preferred. Nonvolatile solvents ($b_{nv}$) having amine functional groups ($F_1$) may be obtained via reaction of the acid functional nonvolatile solvent ($b_{nv}$) to form an amide, followed by conversion to a nitrile and subsequent reduction to an amine.

Nonvolatile solvents ($b_{nv}$) having isocyanate functional groups ($F_1$) may be obtained via reaction of the amine functional nonvolatile solvent ($b_{nv}$) described above with carbon dioxide.

Aminoplast functional groups may be defined as those functional groups resulting from the reaction of an activated amine group and an aldehyde or formaldehyde. Illustrative activated amine groups are melamine, benzoguanamine, amides, carbamates, and the like. The resulting reaction product may be used directly as functional group ($F_1$) or may be etherified with a monofunctional alcohol prior to use as functional group ($F_1$).

Nonvolatile solvents ($b_{nv}$) having aminoplast functional groups ($F_1$) may be made via reaction of carbamate functional nonvolatile solvent ($b_{nv}$) as described above with formaldehyde or aldehyde. The resulting reaction product may optionally be etherified with low boiling point alcohols.

Nonvolatile solvents ($b_{nv}$) having aldehyde functional groups ($F_1$) may be made via reduction of the acid functional nonvolatile solvents ($b_{nv}$) described above.

Nonvolatile solvents ($b_{nv}$) having urea functional groups ($F_1$) may be made via reaction of an amine functional nonvolatile solvent ($b_{nv}$) with urea. Alternatively, amine functional nonvolatile solvent ($b_{nv}$) can be reacted with phosgene followed by reaction with ammonia to produce the desired urea functional groups ($F_1$).

Nonvolatile solvents ($b_{nv}$) having epoxy functional groups ($F_1$) may be made using either saturated or unsaturated fatty acids described above. If an unsaturated fatty acid is used, reaction with peroxide will form internal epoxy groups. More preferably, an acid or hydroxyl functional nonvolatile solvent ($b_{nv}$) will be reacted with epichlorohydrin. Preferred epoxy functional nonvolatile solvents ($b_{nv}$) will be obtained using saturated starting materials.

Nonvolatile solvents ($b_{nv}$) having cyclic carbonate functional groups ($F_1$) may be made via carbon dioxide insertion into an epoxy functional nonvolatile solvent ($b_{nv}$) as described above.

In one exemplary embodiment, nonvolatile solvent ($b_{nv}$) will comprise one or more of the following structures:

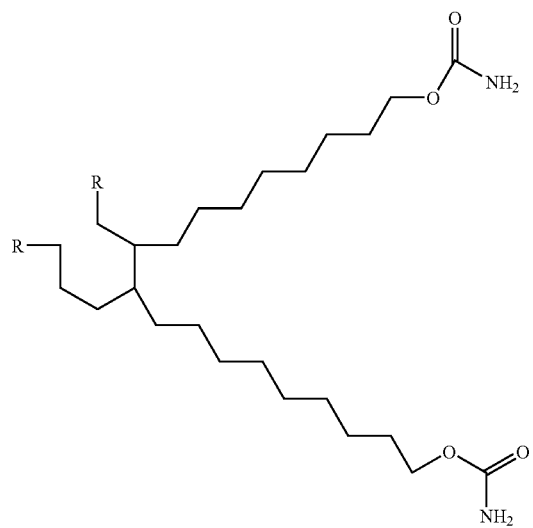

-continued

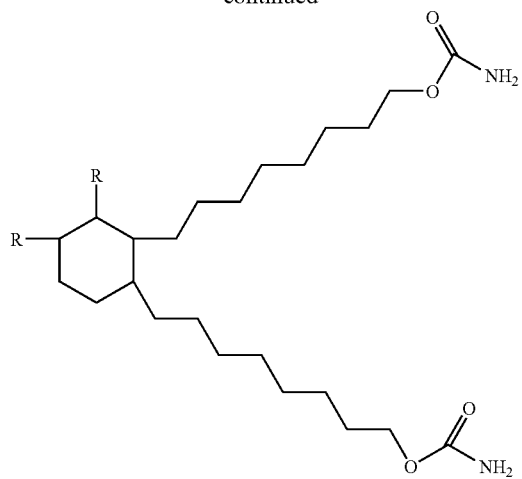

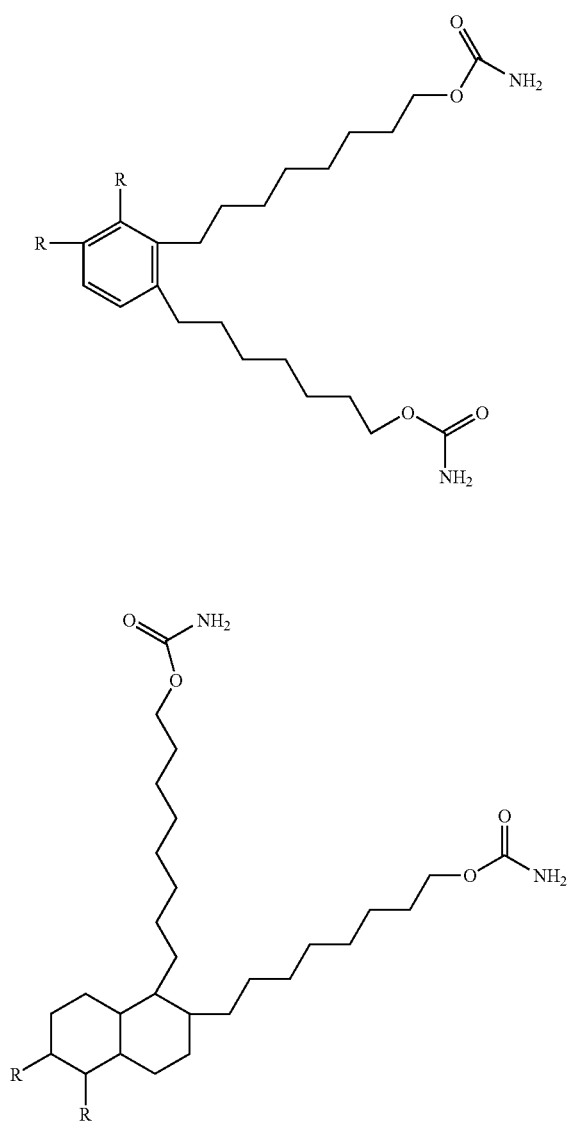

-continued

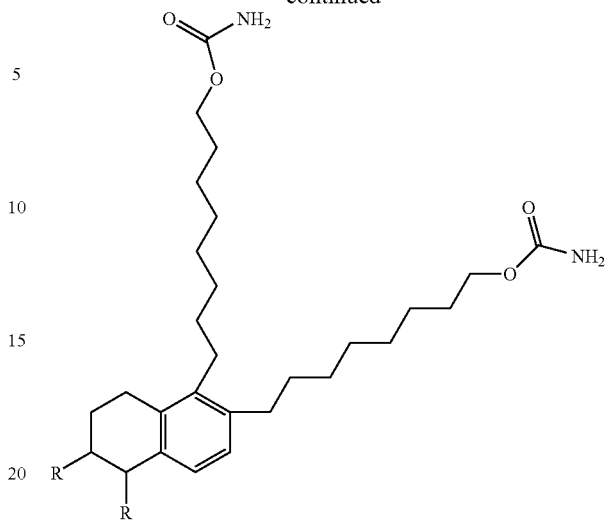

R=C$_5$-C$_8$

The disclosed method requires that the material comprising a functional group $F_c$ be subjected to a free radical source. The material is exposed to the free radical source for a time sufficient to go through three half lives of the free radical initiator discussed below, preferably sufficient to go through 6 or more half lives of the free radical initiator. A half life is the time required under any given reaction condition for the initiator to decompose by one half. In one exemplary embodiment, most functional groups $F_c$ will be eliminated as a result of a reaction with a free radical generated by the free radical source. In general, the material is exposed to the free radical source for a time sufficient to destroy or convert the groups $F_c$ that are subject to free radical degradation so that functional groups $F_c$ are be reduced to an amount that is less than that of the original material. In one exemplary embodiment, functional groups $F_c$ will be reduced by 20% to 100%, relative to the concentration of $F_c$ in the original material. In one embodiment, the material is not polymerized as a result of exposure to the free radical source. That is, the material will not experience any significant increase in molecular weight. In this case, the material after treatment will generally experience less than a 30% increase in average molecular weight, relative to the starting material before treatment. In one embodiment, the material will experience a less than 10% increase in average molecular weight.

In one embodiment, the free radical source comprises a free radical initiator and a free radical trigger.

A free radical initiator as used herein refers to a chemical source of free radicals. Nonlimiting examples include peroxides such as cumyl peroxide, acetyl peroxide, benzoyl peroxide, lauroyl peroxide, tert-butyl hydroperoxide, tert-butyl perbenzoate and tert-butyl peroxide; azo materials such as 2, 2'a zobisisobutyronitrile and phenyl-azo-triphenylmethane; and the like. In one embodiment, peroxides will be used.

A free radical trigger as used herein refers to an energy source that causes the free radical initiator to produce free radicals. Illustrative examples include those discussed above. In one exemplary embodiment, the free radical trigger employed in the disclosed method will be thermal energy, radiation or ultrasonic energy.

The free radical source will generally be used in an amount of at least 1.0 to 25.0, based on the weight of the free radical source to the weight of the material to be treated, more preferably 1.0 to 15.0.

Illustrative free radical polymerization processes that may be used include traditional acrylic free radical polymerization processes.

In one exemplary embodiment, the free radical source will further comprise a free radical enhancer. Free radical enhancer refers to compounds that react under free radical reaction conditions to cap an existing free radical and form a different radical separate from the capped existing free radical. Examples include chain transfer agents.

Chain transfer agents are known in the art. Examples of suitable chain transfer agents include thiols and the dimmer of alpha methyl styrene, with the latter being preferred. In one embodiment, the chain transfer agents will be free of halogens.

The free radical enhancers will be used in an amount of less than 10%, based on the weight of the material to be treated, preferably from 1 to 10, most preferably from 2 to 6%.

In one exemplary embodiment, the step of subjecting the material to the free radical source may be done in the presence of a reactive mixture (a). In this case, the reactive mixture (a) will result in the production of a polymer (a') after the material and the reactive mixture (a) are subjected to the free radical source.

Polymer (a') may be any polymer, oligomer or mixture thereof, resulting from the polymerization of reactant mixture (a). As used herein 'polymer (a') may generally have a number average molecular weight of from 400 to 50,000 Daltons. Usually, the polymer (a') will have a number average molecular weight of from 1000 to 50,000 Daltons. In one exemplary embodiment, polymer (a') will be an acrylic polymer.

Representative examples of polymerizable vinyl monomers include, without limitation, such compounds as vinyl acetate, vinyl propionate, vinyl ethers such as vinyl ethyl ether, vinyl and vinylidene halides, and vinyl ethyl ketone.

Representative examples of aromatic or heterocylic aliphatic vinyl compounds include, without limitation, such compounds as styrene, alpha-methyl styrene, vinyl toluene, tert-butyl styrene, and 2-vinyl pyrrolidone.

Representative examples include acrylic and methacrylic acid amides and aminoalkyl amides; acrylonitrile, and methacrylonitriles.

Other suitable examples include acrylates or methacrylates having hydroxy, epoxy, or other functional groups, such as hydroxyalkyl acrylates and methacrylates, glycidyl esters of methacrylic and acrylic acid such as glycidyl methacrylate, and aminoalkyl esters of methacrylic or acrylic acid like N,N-dimethylaminoethyl (meth)acrylate.

Acrylic monomers having carbamate functionality in the ester portion of the monomer are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

Ethylenically unsaturated isocyanate monomers are well-known in the art and include meta-isopropenyl-.alpha.,.alpha.-dimethylbenzyl isocyanate (sold by American Cyanamid as TMI®) and isocyanatoethyl methacrylate.

Cyclic carbonate ethylenically unsaturated monomers are well-known in the art and include (2-oxo-1,3-dioxolan-4-yl)methyl methacrylate.

When polymer (a') is an acrylic resin, it will generally have a number average molecular weight of from 1000 to 50,000, preferably from 10,000 to 25,000, with molecular weights of from 15,000 to 20,000 being most preferred.

In a preferred embodiment, polymer (a') will be a hydroxyl or carbamate functional resin that may or may not be water dispersible. For example, in one preferred embodiment, polymer (a') will be a water dispersible acrylic polymer having a hydroxyl equivalent weight of from 250 to 1500 g/mole and an acid equivalent weight of from 500 to 3000 g/mole. In another preferred embodiment, the polymer (a') will be a water dispersible acrylic polymer having a carbamate equivalent weight of from 250 to 1500 g/mole and an acid equivalent weight of from 500 to 3000 g/mole. In another preferred embodiment, the polymer (a') is an acrylic polymer having a hydroxyl equivalent weight of from 250 to 1500 g/mole and an acid equivalent weight greater than 3000 g/mole. Finally, in another preferred embodiment, the polymer (a') is an acrylic polymer having a carbamate equivalent weight of from 250 to 1500 g/mole and an acid equivalent weight greater than 3000 g/mole.

If the material comprising functional group $F_c$ is subjected to the free radical source in the presence of a reactive mixture (a), the material to be treated must be substantially inert in three ways with respect to the reactive mixture (a) and the free radical source. "Substantially inert" as used herein refers to a degree of reaction between the material to be treated and the reaction mixture (a) of less than 3% of the total of all functionality on the material other than that of functional groups $F_c$, preferably less than 2%, and most preferably less than 1% of the total of all functional groups other than functional groups $F_c$.

First, the material to be treated must be substantially inert or nonreactive with any functional groups on components of reactant mixture (a) under the free radical polymerization conditions. Thus, the material to be treated must generally be free of any functional groups that are reactive with one or more functional groups of the components of reactant mixture (a) under the free radical conditions used to polymerize reactant mixture (a). Any functional groups ($F_1$) of the material to be treated will thus normally be free of any groups that are reactive with one or more functional groups of the components of reactant mixture (a) under conditions used to polymerize reactant mixture (a). However, in contrast, functional groups $F_c$ are intended to react under the free radical polymerization conditions. As such, functional groups $F_c$ are not subject to the conditions of 'substantially inert' as discussed with respect to any functional groups $F_1$ of the material to be treated.

Second, the material to be treated must be substantially inert or nonreactive during the polymerization of reactant mixture (a). That is, the material may not polymerize under the polymerization conditions that result in the transformation of reactant mixture (a) into polymer (a').

Finally, the material to be treated must be substantially inert or nonreactive with the resulting polymer (a') while under the free radical polymerization conditions used to polymerize reactant mixture (a).

In another embodiment, the disclosed method may further comprise an additional step wherein the environmentally durable material is reacted is reacted with at least one reactant (e) to provide a nonvolatile solvent (b'$_{nv}$) comprising at least two functional groups (F$_2$). As previously indicated, such reactions may occur before, during or after the polymerization of reactant mixture (a) to polymer (a').

The environmentally durable materials are useful in curable coating compositions in an amount of from 1 to 95, preferably from 1 to 60, most preferably 1 to 30%, based on the total nonvolatile of the curable coating composition.

Curable coating compositions disclosed herein may also comprise other components in addition to the environmentally durable materials provided by the disclosed method.

In one exemplary embodiment, the disclosed curable coating composition will comprise a binder (A). Illustrative binders include acrylic polymers, including hydroxyl functional acrylic polymers, carbamate functional acrylic polymers, and acrylic polymers having both hydroxyl and carbamate functionality; polyurethane polymers, polyester polymer, again including hydroxyl functional polyester polymers, carbamate functional polyester polymers, and polyester polymers having both hydroxyl and carbamate functionality, epoxy upgrade polymers, dendrimer polymers, and the like. In one exemplary embodiment, the binder will be an acrylic polymer, a polyurethane polymer, or a polyester polymer. In one especially exemplary embodiment, the binder will be a polyurethane polymer or an acrylic or polyester polymer having hydroxyl functionality, primary carbamate functionality, or a mixture thereof, with acrylic polymers being especially preferred. In another embodiment, the binder (A) will be the polymer (a').

In one embodiment, the disclosed curable coating composition will comprise at least one crosslinking agent (B). In one exemplary embodiment, crosslinking agent (B) will comprise at least one functional group (fi) that is reactive with any functional groups of the environmentally durable material produced by the disclosed method. Crosslinking agent (B) may further comprise additional functional groups (fii) that are reactive with any functional groups of polymer (a'). The disclosed coating compositions may comprise one or more crosslinking agents (B), wherein functional groups (fi) and (fii) are on the same or different crosslinking agents (B). In one exemplary embodiment, a disclosed coating composition will comprise at least one crosslinking agent (B) having both functional groups (fi) and (fii).

Illustrative examples of crosslinking agents (B) are those crosslinking agents having one or more crosslinkable functional groups. Such functional groups include, for example, aminoplast, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful crosslinkable functional groups include hydroxy, epoxy, acid, anhydride, silane, activated methylene and acetoacetate groups. Preferred crosslinking agents will have crosslinkable functional groups that include hydroxy functional groups and amino functional groups and isocyanate groups. Di- and/or polyisocyanates and/or aminoplast resins are most preferred for use as crosslinking agents in coating compositions comprising the mixture (II) of the invention. Mixed crosslinkers may also be used.

The coating compositions of the invention are particularly suitable for use in automotive coating compositions, especially primers, basecoats, and/or clearcoats, with clearcoats being especially preferred. The coating compositions of the invention may be powder coatings, waterborne, power slurry, or solventborne.

Coating compositions of the present invention preferably form the outermost layer or layer of coating on a coated substrate. Preferably, the instant coating compositions are applied over one or more layers of primer coatings. For example, the coating compositions of the invention may be used as an automotive topcoat coating applied over a layer of electrocoat primer and/or primer surfacer.

When such coating compositions are used as topcoat coatings, they preferably have a 20 degree gloss, as defined by ASTM D523-89, of at least 80 or a DOI, as defined by ASTM E430-91, of at least 80, or both. Such gloss and DOI are particularly useful in providing an automotive finish that will appeal to the buyer of the vehicle. Topcoat coatings may be one coat pigmented coatings or may be a color-plus-clear composite coating.

Coating compositions of the present invention, if used as a one coat pigmented coating or the color coating of a color-plus-clear composite coating, will include one or more pigments well-known in the art, such as inorganic pigments like titanium dioxide, carbon black, and iron oxide pigments, or organic pigments like azo reds, quinacridones, perylenes, copper phthalocyanines, carbazole violet, monoarylide and diarylide yellows, naphthol orange, and the like.

In a preferred embodiment, the coating composition of the present invention is the clearcoat of a color-plus-clear composite coating. The clearcoat may be applied over a color coat according to the invention or may be applied over a color coat of a formulation already known in the art. Pigmented color coat or basecoat compositions for such composite coatings are well known in the art and do not require explanation in detail herein. Polymers known in the art to be useful in basecoat compositions include acrylics, vinyls, polyurethanes, polycarbonates, polyesters, alkyds, and polysiloxanes. Such basecoats may comprise the polymer (a') of the invention. Preferred polymers include acrylics and polyurethanes.

Other materials well-known to the coatings artisan, for example, surfactants, fillers, stabilizers, wetting agents, dispersing agents, adhesion promoters, UV absorbers, light stabilizers such as HALS, antioxidants, solvents, catalysts, and/or rheology control agents, may also be incorporated into the coating compositions of the invention. The amount of these materials used must be controlled to achieve the desired performance properties and/or to avoid adversely affecting the coating characteristics.

Coating compositions can be coated onto an article by any of a number of techniques well known in the art. These include, for example, spray coating, dip coating, roll coating, curtain coating, and the like. For automotive body panels, spray coating is preferred. When the coatings will be relatively thick, they are usually applied in two or more coats separated by a time sufficient to allow some of the water and/or solvent evaporate from the applied coating layer ("flash"). The coats as applied are usually from 1 to 3 mils of the coating composition, and a sufficient number of coats are applied to yield the desired final coating thickness.

Where a color-plus-clear composite coating is applied to the prepared substrate, the color coat is usually applied in one or two coats, then allowed to flash, and the clear coat is then applied to the uncured color coat in one or two coats. The two coating layers are then cured simultaneously. Preferably, the cured base coat layer is 0.5 to 1.5 mils thick and the cured clear coat layer is 1 to 3 mils, more preferably 1.6 to 2.2 mils thick.

Coating compositions of the invention are preferably subjected to conditions so as to cure the coating layers. Although various methods of curing may be used, thermal-curing is preferred. Generally, thermal curing is effected by exposing the coated article to elevated temperatures provided primarily by radiative heat sources. Curing temperatures will vary depending on the particular blocking groups used in the crosslinking agents, however they generally range between 93 degree C. and 177 degree C. In a preferred embodiment, the cure temperature is between 135 degree C. and 165 degree C. In another preferred embodiment, a blocked acid catalyst is included in the composition and the cure temperature is between 115 degree C. and 140 degree C. In a different preferred embodiment, an unblocked acid catalyst is included in the composition and the cure temperature is between 80 degree C. and 100 degree C. The curing time will vary depending on the particular components used and physical parameters, such as the thickness of the layers. Typical curing times range from 15 to 60 minutes, and preferably 15-25 minutes at the target temperature.

EXAMPLES

Example 1

Part 1 A

Preparation of an Untreated Material

A mixture of 662 parts of 17.4 parts of methyl carbamate, 59.0 parts of Pripol 2030 (Uniqema) 22.9 parts of toluene, 0.1 parts of dibutyl tin oxide and 0.5 parts of triisodecyl phosphite were heated to reflux under an inert atmosphere. Once at reflux, the inert atmosphere was turned off and the resulting methanol by product was removed. Additional toluene was added to the reaction mixture as needed to keep the reflux temperature below 133° C. The reaction was taken to over 95% conversion of hydroxy groups to primary carbamate groups.

Part 1 B

Treatment of a Material Per the Invention 81.8 parts of the reaction mixture from Part 1 A and 1.2 parts of octane thiol were heated under an inert atmosphere to 120° C. Then a mixture of 5.4 parts of t-butyl per-2-ethylhexanoate and 11.6 parts of toluene were added over a two hour period. The reaction was then held at 120° C. for an additional hour. The solvent and excess methyl carbamate was then removed by vacuum distillation to produce a low viscosity liquid that solidified into a wax when cooled to room temperature.

Example 2

Treatment of a Material Per the Invention 93.3 parts of the reaction mixture from Part 1A and 1.4 parts of the dimer of alpha methyl styrene were heated to 120° C. under an inert atmosphere. Then 5.3 parts of t-butyl per-2-ethylhexanoate was added over a two hour period. The reaction mixture was then held at 120° C. for an additional hour. The solvent and excess methyl carbamate was then removed by vacuum distillation to produce a low viscosity liquid that solidified into a wax when cooled to room temperature.

Example 3

Preparation of Untreated Material

The solvent and excess methyl carbamate was removed from a cut of the above reaction mixture from Part 1 A by vacuum distillation to produce a low viscosity liquid that solidified into a wax when cooled to room temperature.

Example 4

Preparation of Curable Coatings

Curable coatings were prepared by combining the following components in order under agitation.

TABLE 1

|  | Coatings | | |
| --- | --- | --- | --- |
|  | 1 | 2 | 3 |
| Carbamate functional acrylic | 775.09 | 775.09 | 775.09 |
| Example 1 Material | 250.64 | — | — |
| Example 2 Material | — | 250.64 | — |
| Example 3 Material | — | — | 250.64 |
| Polymeric butylated melamine | 309.83 | 309.83 | 309.83 |
| Rheology control agent[1] | 202.43 | 202.43 | 202.43 |
| UVA[2] | 31.58 | 31.58 | 31.58 |
| HALS[3] | 15.00 | 15.00 | 15.00 |
| PBA | 4.00 | 4.00 | 4.00 |
| Blocked acid catalyst[4] | 48.00 | 48.00 | 48.00 |
| Methyl propyl ketone | 100.00 | 100.00 | 100.00 |
| Aromatic 100 | 169.98 | 169.98 | 169.98 |

The resultant clearcoat coating compositions were sprayed wet on wet over a black waterborne basecoat to achieve a dry clearcoat film build of 1.8-2.0 mils after a 10' ambient flash and a 25'@ 275° C. bake. The substrate was coated cold rolled steel.

The panels were then placed in a QUV cabinet with a UVB-313 bulb set to cycle for 8 hours light followed by 4 hours humidity. Table 2 sets forth the number of hours at which unacceptable failure/defects were noted.

TABLE 2

|  | 1 | 2 | 3 |
| --- | --- | --- | --- |
| QUV (fails at) | 3000 hrs. | 3000 hrs. | 2000 hrs. |

[1]9% fumed silica in carbamate acrylic
[2]Tinuvin 384B
[3]Tinuvin 123
[4]Nacure 1075

It can be seen that cured films 1 and 2 made from curable coating compositions 1 and 2 containing the treated materials show a significant improvement of almost 1000 hours additional QUV.

The invention claimed is:

1. A method of making an environmentally durable material, comprising providing a material comprising at least one functional group $F_c$ that gives rise to a free radical upon exposure to a free radical trigger, and subjecting the material to a free radical source such that substantially all functional groups $F_c$ are eliminated to provide an environmentally durable material that is not polymerized and has less than a 30% increase in average molecular weight as a result of exposure to the free radical source.

2. The method of claim 1 wherein the material comprises a plurality of functional groups $F_c$.

3. The method of claim 1 wherein functional group $F_c$ is present in the material as a contaminant.

4. The method of claim 3 wherein the material comprises less than 15% by weight of functional group $F_c$, based on the total weight of the material.

5. The method of claim 3 wherein the material comprises at least 0.05% by weight of functional group $F_c$, based on the total weight of the material.

6. The method of claim 5 wherein the material comprises from 0.10 to 10% by weight of functional group $F_c$, based on the total weight of the material.

7. The method of claim 1 wherein the functional group $F_c$ is one of a nonaromatic carbon-carbon double bond, a hydrogen alpha to an aromatic ring, a hydrogen alpha to a carbon-carbon double bond, or a hydrogen attached to a tertiary substituted carbon.

8. The method of claim 1 wherein the free radical source comprises an initiator and an initiator trigger.

9. The method of claim 8 wherein the initiator is at least one of peroxide, azo materials, or mixtures thereof.

10. The method of claim 8 wherein the free radical trigger is at least one of thermal energy, electromagnetic energy, ultrasonic energy, and mixtures thereof.

11. The method of claim 8 wherein the free radical trigger is thermal energy.

* * * * *